United States Patent [19]
Nakamura et al.

[11] Patent Number: 5,745,492
[45] Date of Patent: Apr. 28, 1998

[54] SPEECH INFORMATION FREEZE-OUT CONTROL METHOD AND EQUIPMENT IN MOBILE SATELLITE COMMUNICATION SYSTEM

[75] Inventors: Yoshinobu Nakamura, Zushi; Yutaka Ohto; Takashi Ueda, both of Yokohama; Tomoyuki Ohya, Yokosuka, all of Japan

[73] Assignee: NTT Mobile Communications Network, Inc., Japan

[21] Appl. No.: 591,458

[22] PCT Filed: Jul. 20, 1995

[86] PCT No.: PCT/JP95/01446

§ 371 Date: Jan. 31, 1996

§ 102(e) Date: Jan. 31, 1996

[87] PCT Pub. No.: WO96/03816

PCT Pub. Date: Feb. 8, 1996

[30] Foreign Application Priority Data

Jul. 21, 1994 [JP] Japan ................... 6-169826
Aug. 30, 1994 [JP] Japan ................... 6-205722

[51] Int. Cl.⁶ .................. H04B 7/26; H04B 7/15; H04T 3/00
[52] U.S. Cl. .................. 370/435; 370/519; 370/528; 379/58; 455/54.1
[58] Field of Search .................. 370/313, 314, 370/315, 316, 319, 321, 328, 431–435, 464, 465, 468, 477, 498, 503, 504, 509, 512, 519, 522, 528; 455/53.1, 54.1, 56.1, 12.1; 379/88, 350, 58, 59, 60; 395/2.23, 2.24, 2.79

[56] References Cited

U.S. PATENT DOCUMENTS

| | | | |
|---|---|---|---|
| 3,801,747 | 4/1974 | Queffeulou et al. | 370/435 |
| 4,284,850 | 8/1981 | Clingenpeel | 370/435 |
| 4,295,217 | 10/1981 | Fennel, Jr. et al. | 370/435 |
| 4,897,832 | 1/1990 | Suzuki et al. | 370/435 |
| 5,016,247 | 5/1991 | Cidon et al. | 370/435 |
| 5,436,899 | 7/1995 | Fujino et al. | 370/435 |
| 5,612,955 | 3/1997 | Fernandes et al. | 370/433 |

FOREIGN PATENT DOCUMENTS

| | | |
|---|---|---|
| 5-327575 | 12/1993 | Japan. |
| A-5-327575 | 12/1993 | Japan. |
| 6-197070 | 7/1994 | Japan. |
| A-6-197070 | 7/1994 | Japan. |

OTHER PUBLICATIONS

Technical Report of IEICE, Sep. 5, 1994.

*Primary Examiner*—Alpus H. Hsu
*Assistant Examiner*—Seema S. Rao
*Attorney, Agent, or Firm*—George P. Hoare, Jr.; Rogers & Wells

[57] ABSTRACT

A speech freeze-out method in a communication system for transmitting speech information, which is sent from public telephone terminals (1) to a control center (5) through voice channels, from the control center (5) to a base station (8) through time division multiplexing radio frequency channels (6), and from the base station (8) to mobile stations (17) through transponders (13). The freeze-out processing is carried out when the control center (5) feeds the speech information to the time division multiplexing radio frequency channels (6) so that the number of transmission channels from the base station (8) to the transponders (13) is limited within an upper limit value. The control center (5) sequentially detects the presence and absence of a speech spurt in each frame of respective voice channels during each time slot of the time division multiplexing radio frequency channels, counts the number of the channels including the speech spurt, and performs the speech freeze-out processing when the count value exceeds the upper limit value. The number of transmission channels from the base station (8) to the transponders (13) is positively limited within the upper limit value.

18 Claims, 19 Drawing Sheets

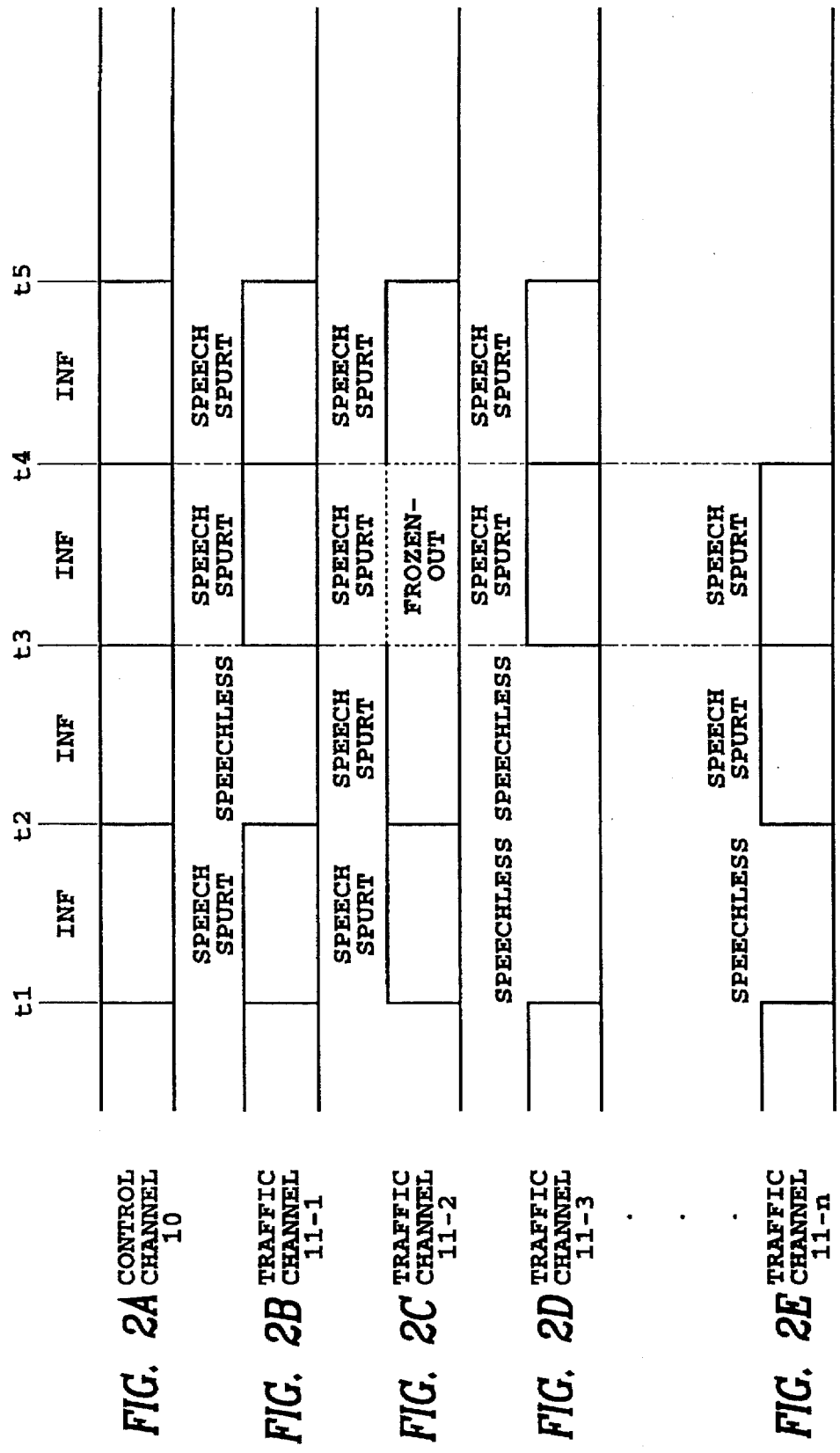

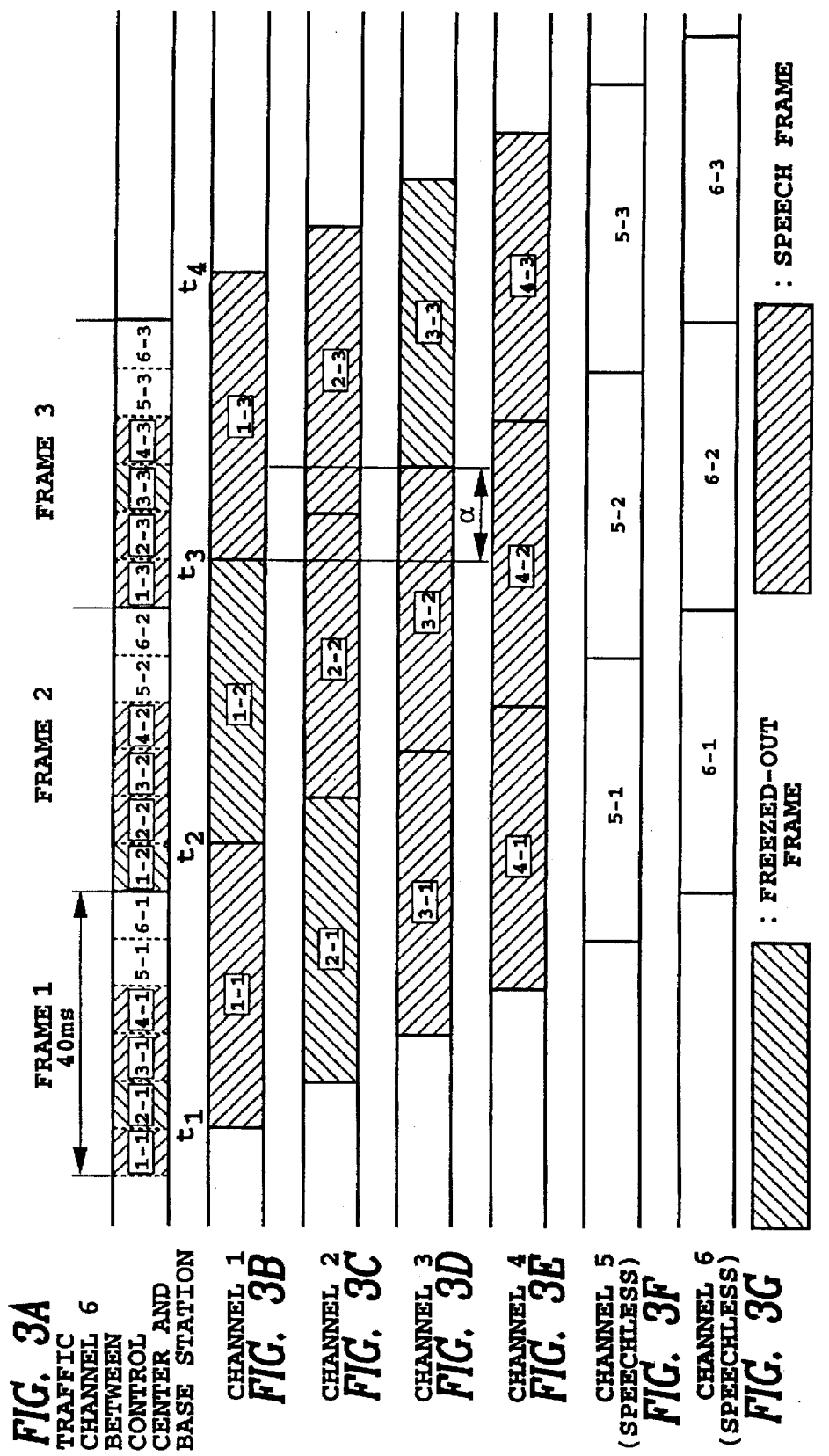

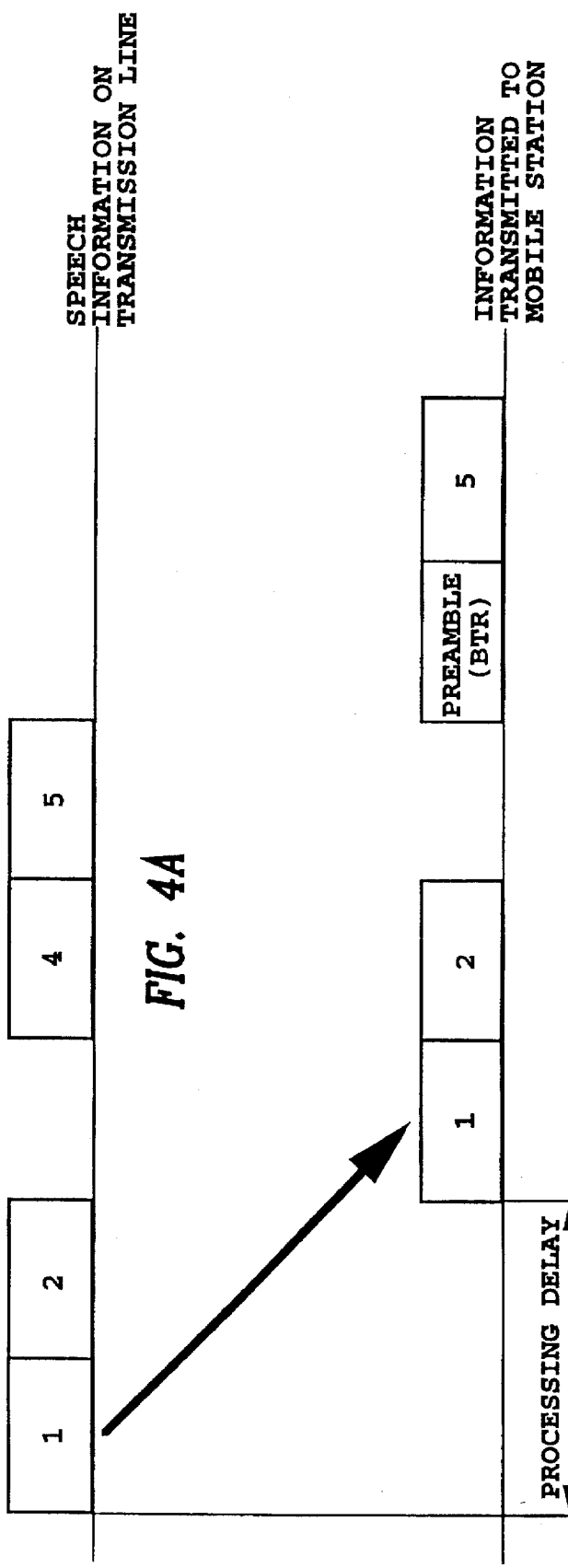

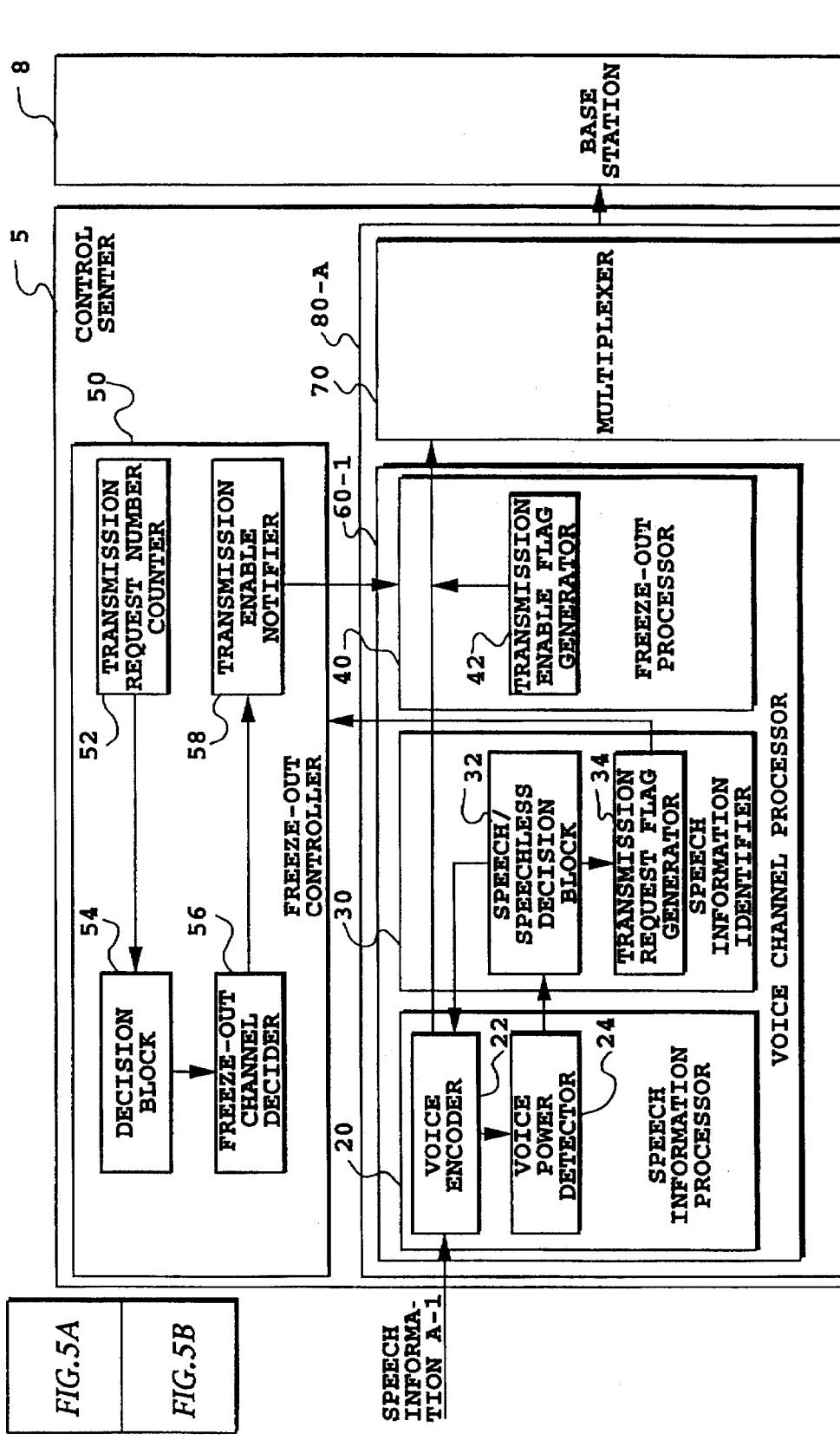

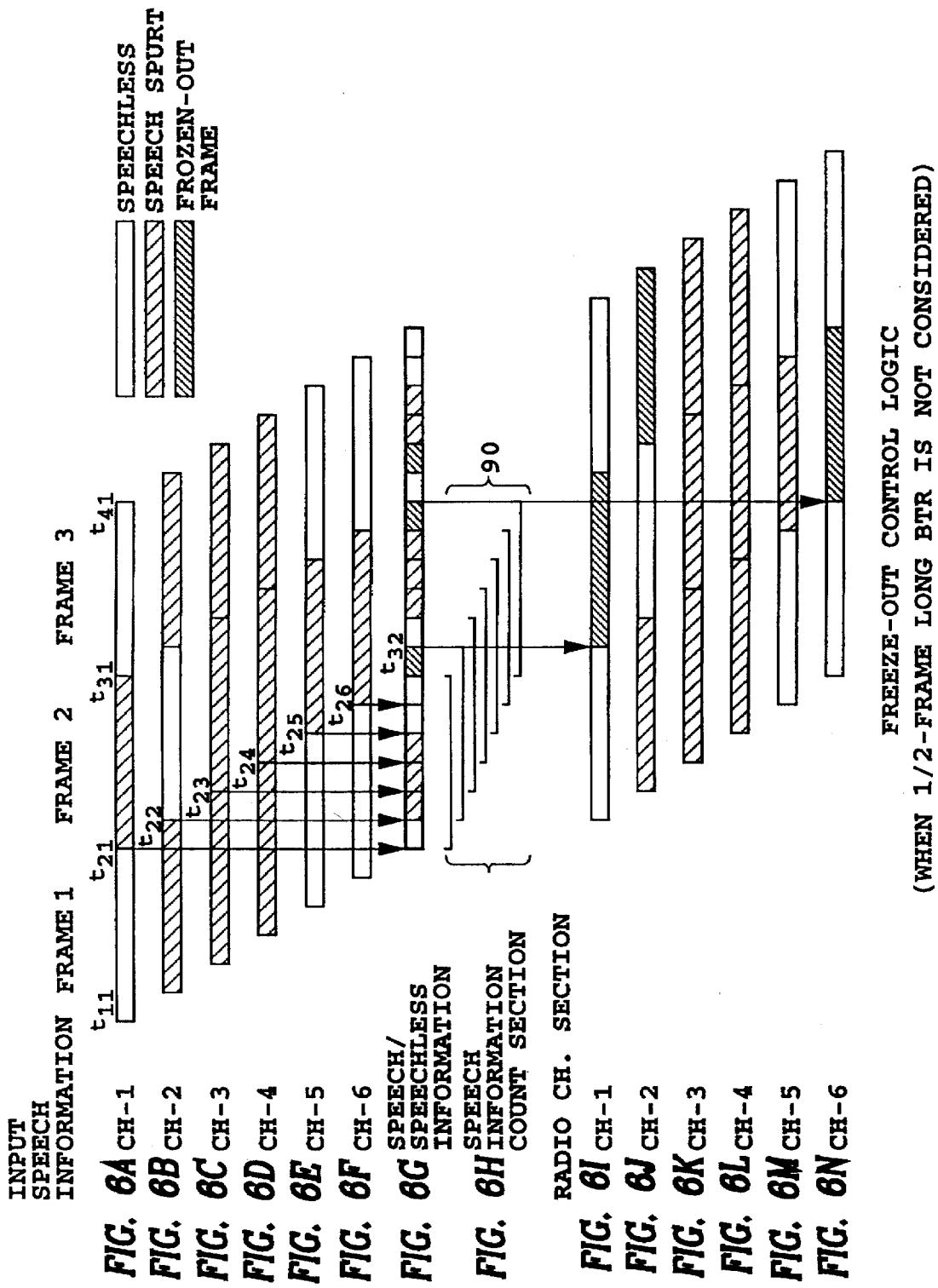

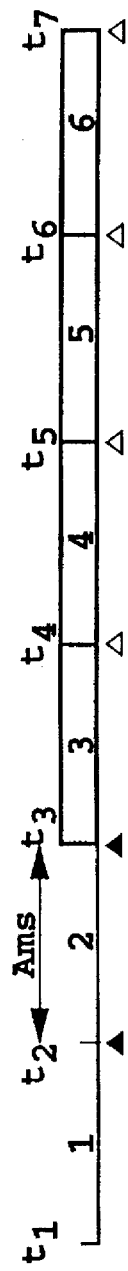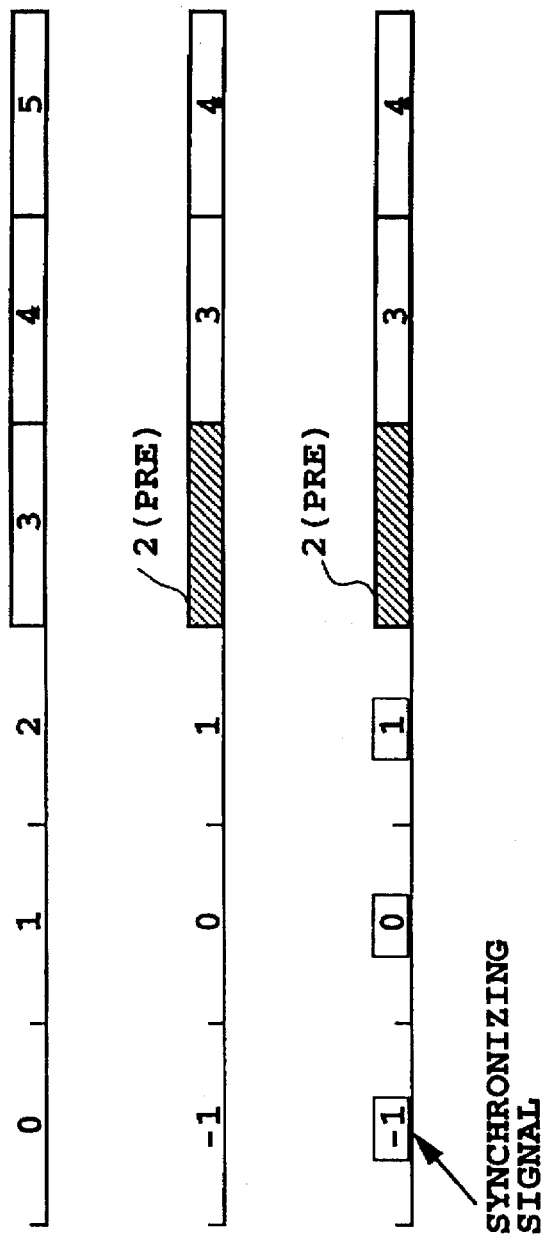
FIG. 12A ORIGINAL SPEECH
FIG. 12B ENCODING
FIG. 12C TRANSMISSION LINE
FIG. 12D RADIO CH. SECTION
(PRIOR ART)

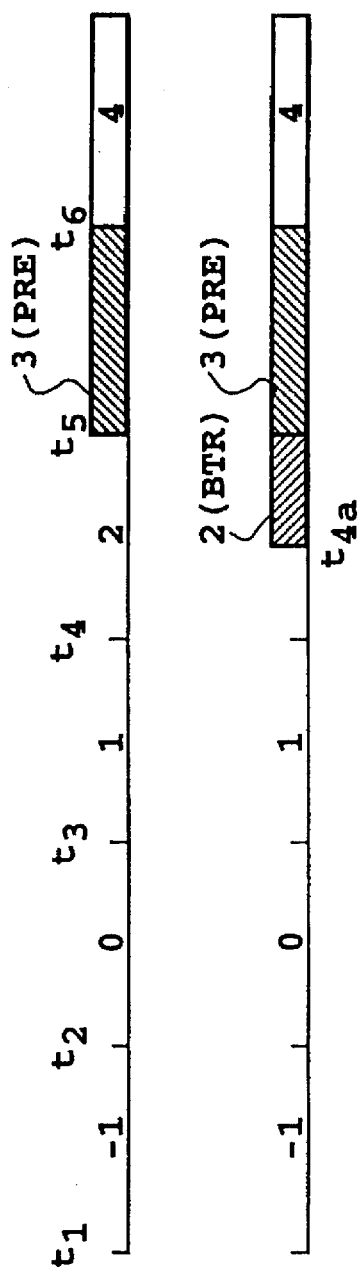

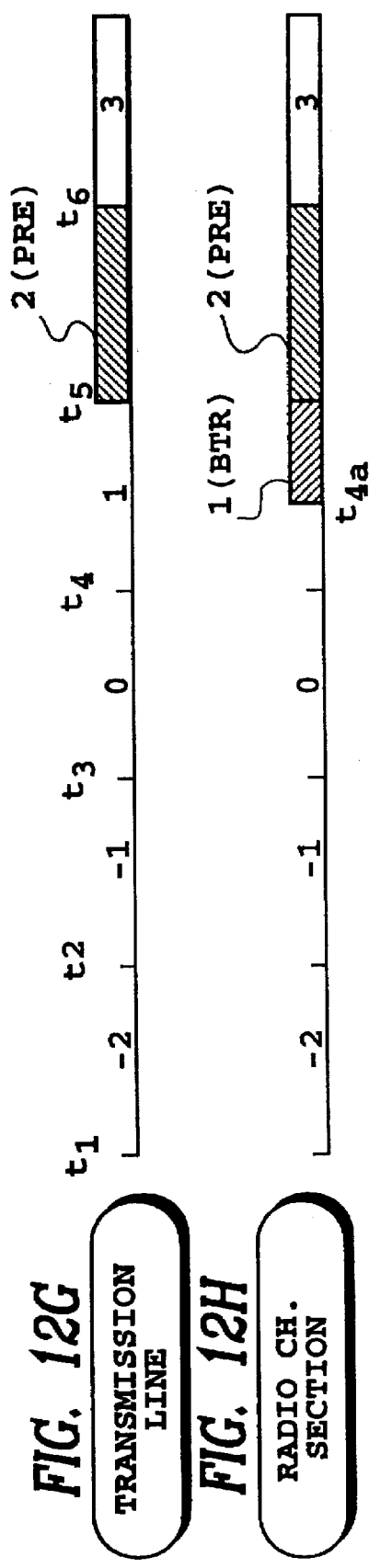

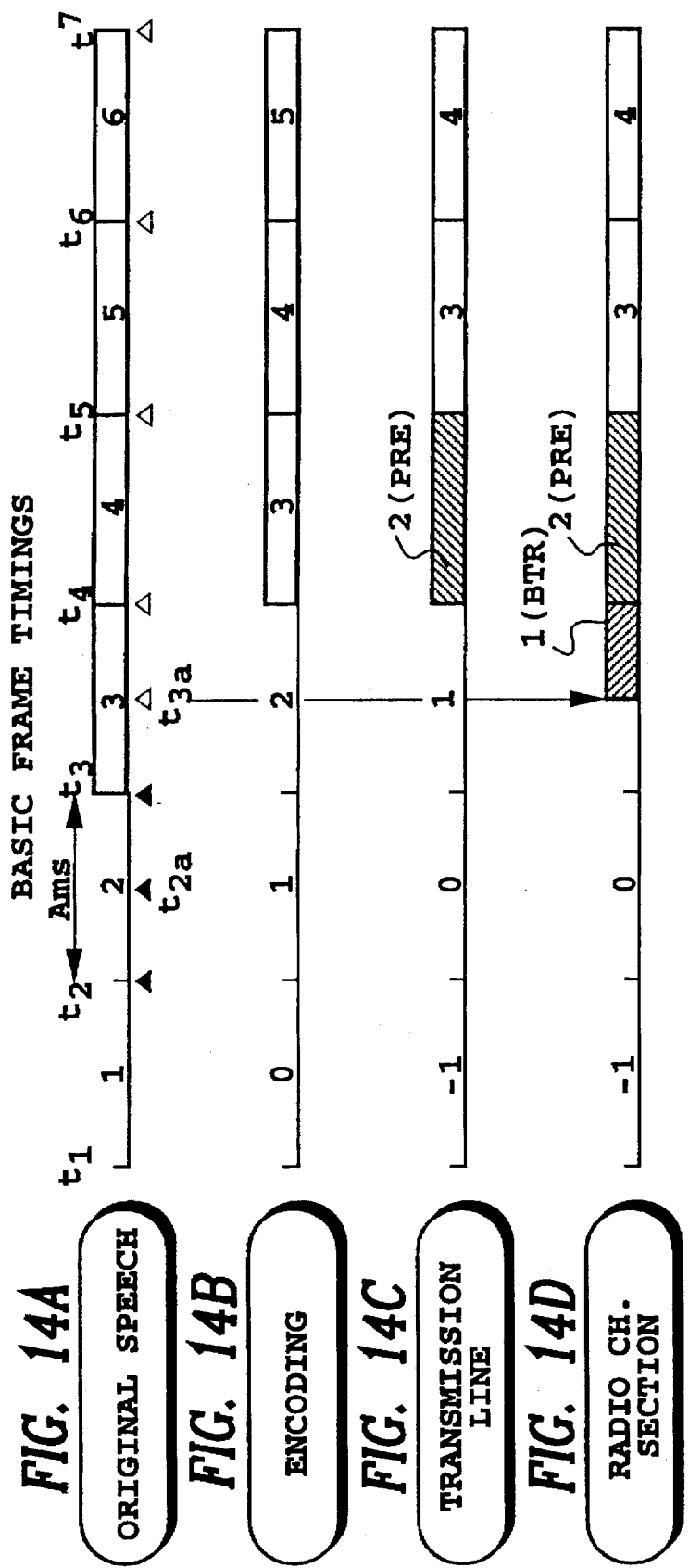

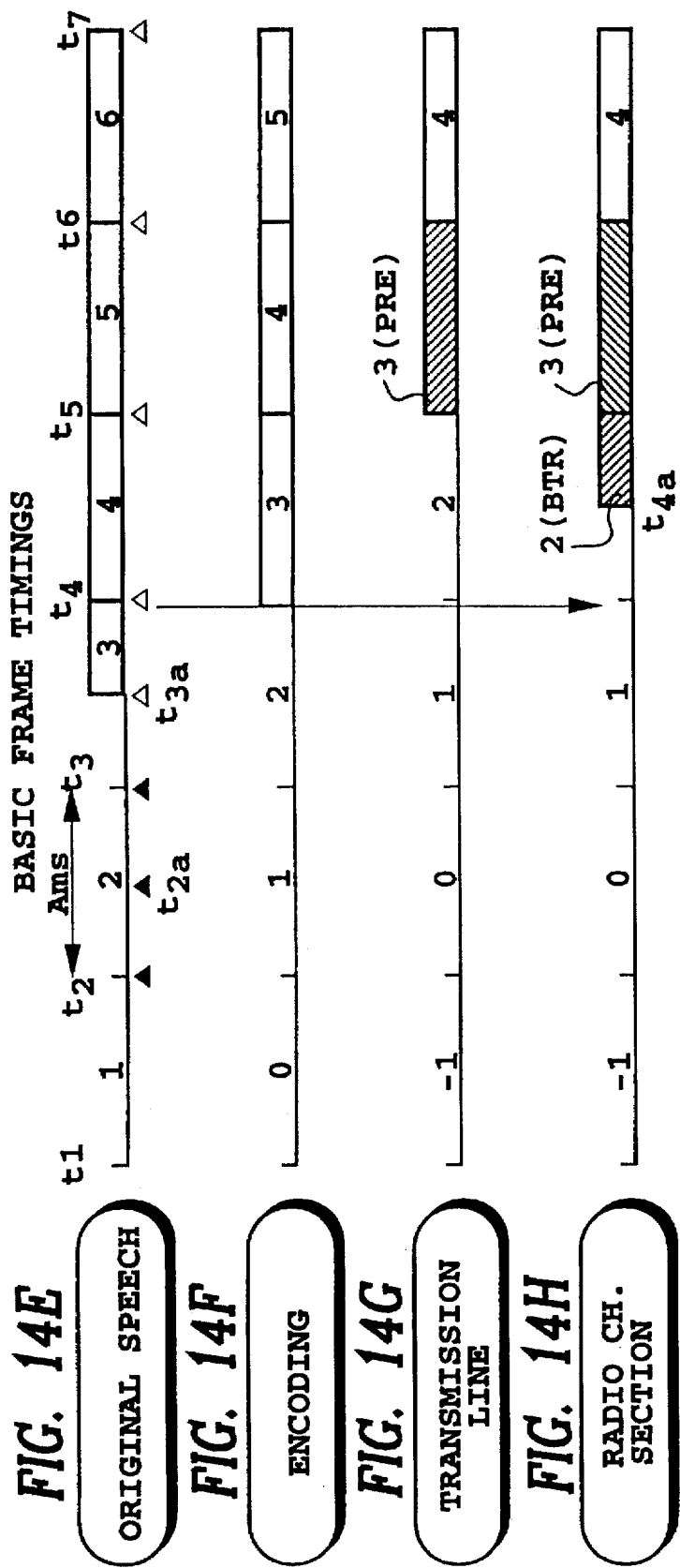

|  | NUMBER OF OMITTED SPEECH FRAMES | |  |
|---|---|---|---|
|  | MAXIMUM VALUE | MEAN VALUE | |
| SINGLE FRAME METHOD | 1 | 1/2 | |
| SUBFRAME METHOD — SPEECH SPURT IS PRESENT IN FIRST HALF OF FRAME | 0 | 0 | 1/8 |
| SUBFRAME METHOD — SPEECH SPURT IS PRESENT IN LATTER HALF OF FRAME | 1/2 | 1/4 | |

SPEECH INFORMATION FREEZE-OUT CONTROL METHOD AND EQUIPMENT IN MOBILE SATELLITE COMMUNICATION SYSTEM

TECHNICAL FIELD

The present invention relates to a mobile satellite communication system in which a radio base station carries out speech communications with a plurality of mobile stations through transponders, and more particularly to a speech information freeze-out control method and equipment in a mobile satellite communication system which freezes-out speech information on the time slot basis of time division multiple access in order to limit the number of voice channels from the radio base station to the transponders when the number of channels including speech information exceeds a predetermined value.

BACKGROUND ART

FIG. 1 shows a general configuration of a mobile satellite communication system. Public telephone terminals 1-1–1-m are connected to a control center 5 through traffic channels 2, a public telephone network 3 and traffic channels 4. The control center 5 is connected to a radio base station 8 through traffic channels 6. The base station 8 is connected to a plurality of radio mobile stations 17-1–17-q through transponders 13. Specifically, the base station 8 is connected to the transponders 13 through an antenna 9, radio frequency channels 11-1–11-n, and an antenna 12 of the transponders 13, and the transponders 13 are connected to the mobile stations 17-1–17-q through an antenna 14 of the transponders 13 and radio frequency channels 16-1–16-n. The traffic channels 6 between the control center 5 and the base station 8 transmit speech information of the telephone terminals 1 in time division multiple access. The radio frequency channels 11-1–11-n and 16-1–16-n employ frequency division multiple access.

The control center 5 performs the time division multiplexing of the speech signals from the telephone terminals 1, and transmits them to the base station 8. In addition, the control center 5 assigns the speech signals to the radio frequency channels 11 connecting the base station 8 to the transponders 13. The results of the assignment is notified from the control center 5 to the base station 8 through control channels 7. The control center 5 further carries out the assignment of traffic channels from the mobile stations 17 to the telephone terminals 1, and informs the mobile stations 17 of the assignment results through control channels 7, 10 and 15. Moreover, control signals like paging signals are transmitted through the control channels. The transponders 13 perform frequency conversion between received carriers and transmitted carriers.

A problem arises with the transponders 13 in that distortion occurs or output power of each channel reduces when the input power of carriers to the transponders exceeds a certain value. For this reason, the input power to the transponders 13 must be limited within the certain value. To achieve this, VOX (Voice Operated Transmission) is performed. The VOX is a control method to start or stop transmission of a radio signal from the base station 8 or a mobile station 17 in response to the presence or absence of speech spurts in view of the fact that a speech spurt ratio, that is, a ratio of speech spurts to the speech duration is about 40% in normal speech.

FIG. 2 is a diagram illustrating the VOX control. This figure illustrates a communication state on the traffic channels 11 connecting the base station 8 to the transponders 13. A public telephone terminal 1-i and a mobile station 17-j start communications through designated traffic channels after the connection therebetween has been completed through the control channels 7, 10 and 15. The transmission of the carrier is stopped during frames including no speech spurts so that only frames including speech spurts are transmitted.

Even such control cannot completely prevent the number of transmission channels from the base station 8 to the transponders 13 from exceeding the upper limit value. For example, assuming that the upper limit value of the number of channels is three, although it presents no problem during time t1–t3 (during the first and second frame intervals) because the number of channels including the speech spurts is two, a problem arises when the number of channels including the speech spurts grows four which exceeds the upper limit value of three during time t3–t4 (during the third frame interval). Accordingly, it is necessary for a certain channel to stop transmission of the carrier from the base station 8 to the transponder 13 even if the channel includes the speech spurt. As indicated by broken lines in FIG. 2(C), the transmission of the carrier of the frame including the speech spurt is forcedly stopped on the traffic channel 11-2 during time t3–t4, thereby freezing out the speech. This is referred to as freeze-out processing, and a channel to be frozen out is randomly decided.

Thus, the conventional freeze-out processing excludes the speech spurt on the frame length basis to restrict the number of the transmission channels from the base station 8 to the transponders 13 within the upper limit value. The freeze-out processing is actually carried out by the control center 5 rather than by the base station 8. More specifically, the control center 5 counts the number of channels including the speech spurts which are fed to the time division multiplexing traffic channels 6, decides a channel to be frozen out if the count value exceeds the upper limit value, and informs the base station 8 of the channel. Then the base station 8 stops the transmission on the channel to the transponder 13.

FIG. 3 is a diagram showing the state of signals which have undergone the freeze-out processing at the control center 5, and are recovered to respective channels in the base station 8. In this figure, it is assumed for the purpose of simplicity that the channels 5 and 6 include no speech, and the upper limit value of the number of the transmission channels is three.

FIG. 3(A) shows a signal on the traffic channel 6 between the control center 5 and the base station 8. Each frame of 40 ms long is divided into six time slots, and speech information of the channels 1–6 are compressed and assigned to the respective time slots, thereby being time division multiplexed. Here, the time slots including speech information are distinguished from the time slots including no speech information by the directions of hatching lines. For example, time slots 2-1, 1-2 and 3-3 do not include speech information because of the freeze-out processing. All the other time slots include speech information.

FIG. 3(B)–(G) show the signal state of the channels 1–6 which are recovered from the time division multiplex at the base station 8, wherein the presence and absence of speech spurts is indicated by the directions of the hatching lines. For example, channel 1 changes from the present to absent state of speech spurts at the end t2 of the first frame, and returns to the present state at the end t3 of the second frame. The base station 8 transmits the speech information of each channel to the transponders 13 immediately after it arrives from the control center 5. In other words, the speech information of each channel is transmitted from the base station 8 to the transponders 13 in such a manner that it is shifted by an amount of 40/6 ms.

The conventional system, however, has a shortage in that the number of transmissions of the speech information can exceeds the upper limit value in part. For example, when the first channel changes from the absent to present state of the speech spurt at time t3 in FIG. 3, the number of transmissions of speech information becomes four, which exceeds the upper limit value of three. This state continues for a time period α at which the speech information of the channel 3 changes from the present to absent state. This drawback arises from the fact that although the control center 5 counts the number of the speech information data in the frame interval (40 ms) as shown in FIG. 2, and time division multiplexes the speech information after the freeze-out processing, the base station 8 transmits the speech information of each channel in such a manner that it is shifted by an amount of ⅙ frame interval as shown in FIG. 3.

The conventional system presents another problem. The problem relates to a preamble of one frame long which the base station 8 transmits to the transponders 13 when the channel changes from the absent to present state of the speech spurt. The preamble is necessary for restoring, when the speech spurt recovers, the synchronization which has been lost owing to interruption of the carrier transmission during the absence of the speech spurt. This type of preamble is referred to as BTR (Bit Timing Recovery) below.

FIG. 4 illustrates a problem involved in the transmission of the BTR. FIG. 4(A) illustrates speech information sent from the control center 5 to the base station 8, and FIG. 4(B) illustrates speech information sent from the base station 8 to the transponders 13. As is clear from this figure, a frame 3 undergone the freeze-out processing and a frame 4 replaced by the BTR are lost from the signal transmitted from the base station 8. Thus, even if the number of frozen-out frame of speech information is only one, two frames are skipped in the transmission signal from the base station 8, resulting in the degradation of the voice quality.

DISCLOSURE OF THE INVENTION

An object of the present invention is to provide a speech information freeze-out control method and equipment in a mobile satellite communication system, which can positively restrict the number of channels which include speech spurts and are inputted to the transponders.

Another object of the present invention is to provide a speech information freeze-out control method and equipment in a mobile satellite communication system, which can minimize omission of speech information due to a preamble.

In a first aspect of the present invention, there is provided speech freeze-out control equipment in a mobile satellite communication system having a plurality of telephone terminals, a control center connected with the telephone terminals through voice channels, a radio base station connected with the control center through time division multiplexing radio frequency channels, and a plurality of mobile stations connected with the base station through transponders, the control center performing, by assigning speech information from the telephone terminals to time slots of the time division multiplexing radio frequency channels, freeze-out of the speech information when sending the speech information to the base station so that the number of channels connected to the transponders is limited within a predetermined upper limit value, the speech freeze-out control equipment comprising:

presence/absence detection means for detecting the presence and absence of a speech spurt of the speech information in each frame on the voice channels;

means for interrupting transmission from the control center to the radio base station in a time slot on the time division multiplexing radio frequency channels, the time slot corresponding to the voice channel including no speech spurt;

means for counting the number of the voice channels including the speech spurt for each time slot on the time division multiplexing radio frequency channels, the counting being carried out from one frame interval before a current time to the current time, the means for counting producing a count value;

means for freezing out speech information on one of the voice channels which is counted last when the count value exceeds the predetermined upper limit value; and means for transmitting speech information on one of the voice channels which is counted last to the base station when the count value of the voice channels including speech spurts is equal to or less than the predetermined upper limit value.

Here, the speech freeze-out control equipment in a mobile satellite communication system may further comprise means for incrementing the count value by one for ½ frame interval from ½ frame interval ahead of freezing out of the speech information to one frame interval ahead thereof.

The speech freeze-out control equipment in a mobile satellite communication system may further comprise means for having the radio base station transmit to the transponders a predetermined preamble of ½ frame long when the presence/absence detection means successively detects a preceding frame including no speech spurt, and a current frame including a speech spurt.

The presence/absence detection means may divide the frame into a plurality of subframes, and may detect the presence and absence of the speech spurt in the frame on the basis of a voice level of each of the subframes.

The speech freeze-out control equipment in a mobile satellite communication system may further comprise means for having the radio base station transmit to the transponders a predetermined preamble of ½ frame long when the presence/absence detection means successively detects a preceding subframe including no speech spurt, and a current subframe including a speech spurt.

In a second aspect of the present invention, there is provided a speech freeze-out control method in a mobile satellite communication system having a plurality of telephone terminals, a control center connected with the telephone terminals through voice channels, a radio base station connected with the control center through time division multiplexing radio frequency channels, and a plurality of mobile stations connected with the base station through transponders, the control center performing, by assigning speech information from the telephone terminals to time slots of the time division multiplexing radio frequency channels, freeze-out of the speech information when sending the speech information to the base station so that the number of channels connected to the transponders is limited within a predetermined upper limit value, the speech freeze-out control method comprising:

a presence/absence detection step of detecting the presence and absence of a speech spurt of the speech information in each frame on the voice channels;

a step of interrupting transmission from the control center to the radio base station in a time slot on the time division multiplexing radio frequency channels, the time slot corresponding to the voice channel including no speech spurt;

a step of counting the number of the voice channels including the speech spurt for each time slot on the time division multiplexing radio frequency channels, the counting being carried out from one frame interval before a current time to the current time, the a step of counting producing a count value;

a step of freezing out speech information on one of the voice channels which is counted last when the count value exceeds the predetermined upper limit value; and a step of transmitting speech information on one of the voice channels which is counted last to the base station when the count value of the voice channels including speech spurts is equal to or less than the predetermined upper limit value.

In a third aspect of the present invention, there is provided a communication system which detects the presence and absence of a speech spurt in speech information in each frame successively sent through a receiving channel, and transmits only frames including the speech spurt through a transmission channel in assigned times for transmission, the assigned times lagging behind reception of the frames by a predetermined delay time, the communication system comprising:

current frame speech spurt detection means for detecting during receiving a current frame whether the current frame includes the speech spurt or not;

transmission interruption means for interrupting transmission of the current frame in the assigned times for transmission when the current frame includes no speech spurt;

preceding frame speech spurt detection means for detecting whether or not a preceding frame immediately before the current frame includes the speech spurt when the current frame includes the speech spurt; and preamble transmission means for transmitting a predetermined preamble at least during the delay time among the delay time and the transmission assigned time for the current frame, when the current frame includes the speech spurt and the preceding frame includes no speech spurt.

Here, the transmission channels may be radio frequency channels.

The current frame speech spurt detection means may divide the current frame into a plurality of subframes, and may detect the presence and absence of the speech spurt on the basis of a voice level of each of the subframes.

The preamble transmission means may successively transmit a preamble for synchronization and a preamble for speech.

In a fourth aspect of the present invention, there is provided communications method which detects the presence and absence of a speech spurt in speech information in each frame successively sent through a receiving channel, and transmits only frames including the speech spurt through a transmission channel in assigned times for transmission, the assigned times lagging behind reception of the frames by a predetermined delay time, the communications method comprising:

a current frame speech spurt detection step of detecting during receiving a current frame whether the current frame includes the speech spurt or not;

a transmission interruption step of interrupting transmission of the current frame in the assigned times for transmission when the current frame includes no speech spurt;

a preceding frame speech spurt detection step of detecting whether or not a preceding frame immediately before the current frame includes the speech spurt when the current frame includes the speech spurt; and a preamble transmission step of transmitting a predetermined preamble at least during the delay time among the delay time and the transmission assigned time for the current frame, when the current frame includes the speech spurt and the preceding frame includes no speech spurt.

BRIEF DESCRIPTION OF THE DRAWINGS

FIG. 2 is a diagram showing conventional VOX control and freeze-out processing executed at a control center;

FIG. 3 is a diagram showing speech information transmitted from a base station to transponders to illustrate a conventional example in which freeze-out processing is not effectively achieved;

FIG. 4 is a diagram illustrating a conventional example in which speech information is skipped due to transmission of a preamble (BTR);

FIGS. 5A and 5B are block diagrams showing a configuration of a first embodiment of speech information freeze-out control equipment in a mobile satellite communication system in accordance with the present invention;

FIG. 6 is a time chart illustrating freeze-out control in the first embodiment, wherein FIGS. 6(A)–(F) show speech information inputted to respective channels CH-1–CH-6 of the control center 5, FIG. 6(G) shows time division multiplex signal transmitted from the control center 5 to a base station 8, FIG. 6(H) shows sections for counting the number of transmission requests, and FIGS. 6(I)–(N) show transmitted signals from the base station 8 to the transponders 13, respectively;

FIG. 10 is a time chart illustrating freeze-out control in the second embodiment, wherein FIGS. 10(A)–(F) show speech information inputted to respective channels CH-1–CH-6 of the control center 5, FIG. 10(G) shows time division multiplex signal transmitted from the control center 5 to the base station 8, FIG. 10(H) shows sections for counting the number of transmission requests, and FIGS. 10(I)–(N) show transmitted signals from the base station 8 to the transponders 13, respectively;

FIG. 12A is a diagram illustrating an insertion state of a speech preamble PRE in the conventional system;

FIG. 12B is a diagram illustrating a speech frame omission due to insertion of the BTR and the speech preamble PRE in the second embodiment;

FIG. 12C is a diagram showing an example in which the BTR and the speech frame PRE are delayed to prevent the speech frame omission in the second embodiment;

FIG. 14A is a diagram illustrating a method for inserting a BTR and a speech preamble PRE when a speech spurt is present in the first half of a frame in the third embodiment which performs speech spurt detection by dividing a frame into two subframes;

FIG. 14B is a diagram illustrating a method for inserting the BTR and speech preamble PRE when a speech spurt is present only in the latter half of a frame in the third embodiment; and FIG. 15 is a table showing the number of omitted speech frames in the third embodiment in comparison with the conventional technique.

BEST MODE FOR CARRYING OUT THE INVENTION

The invention will now be described with reference to the accompanying drawings.

EMBODIMENT 1

Figure 1:
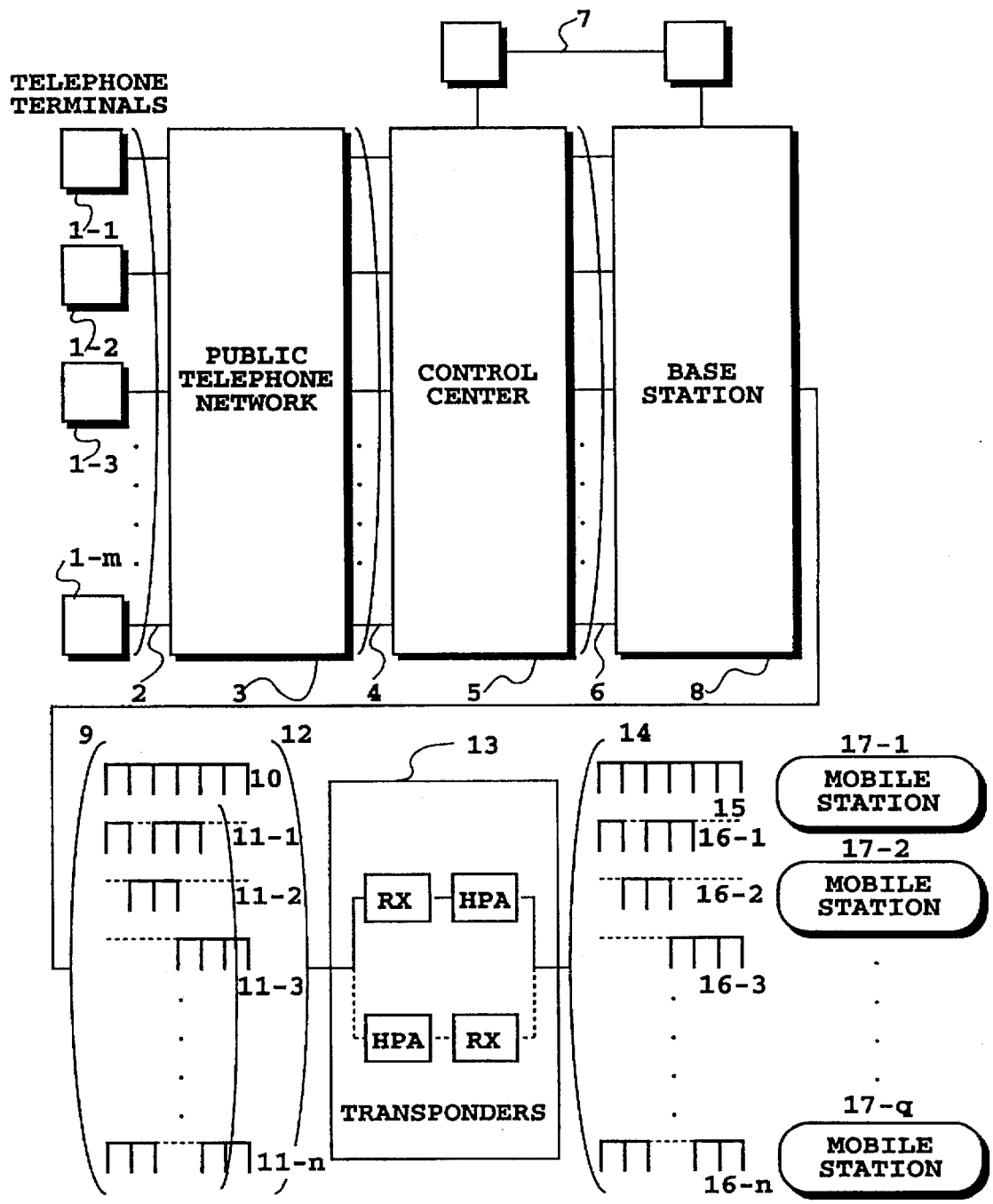
FIG. 1 is a block diagram showing a general configuration of a mobile satellite communication system.
Figure 5B:
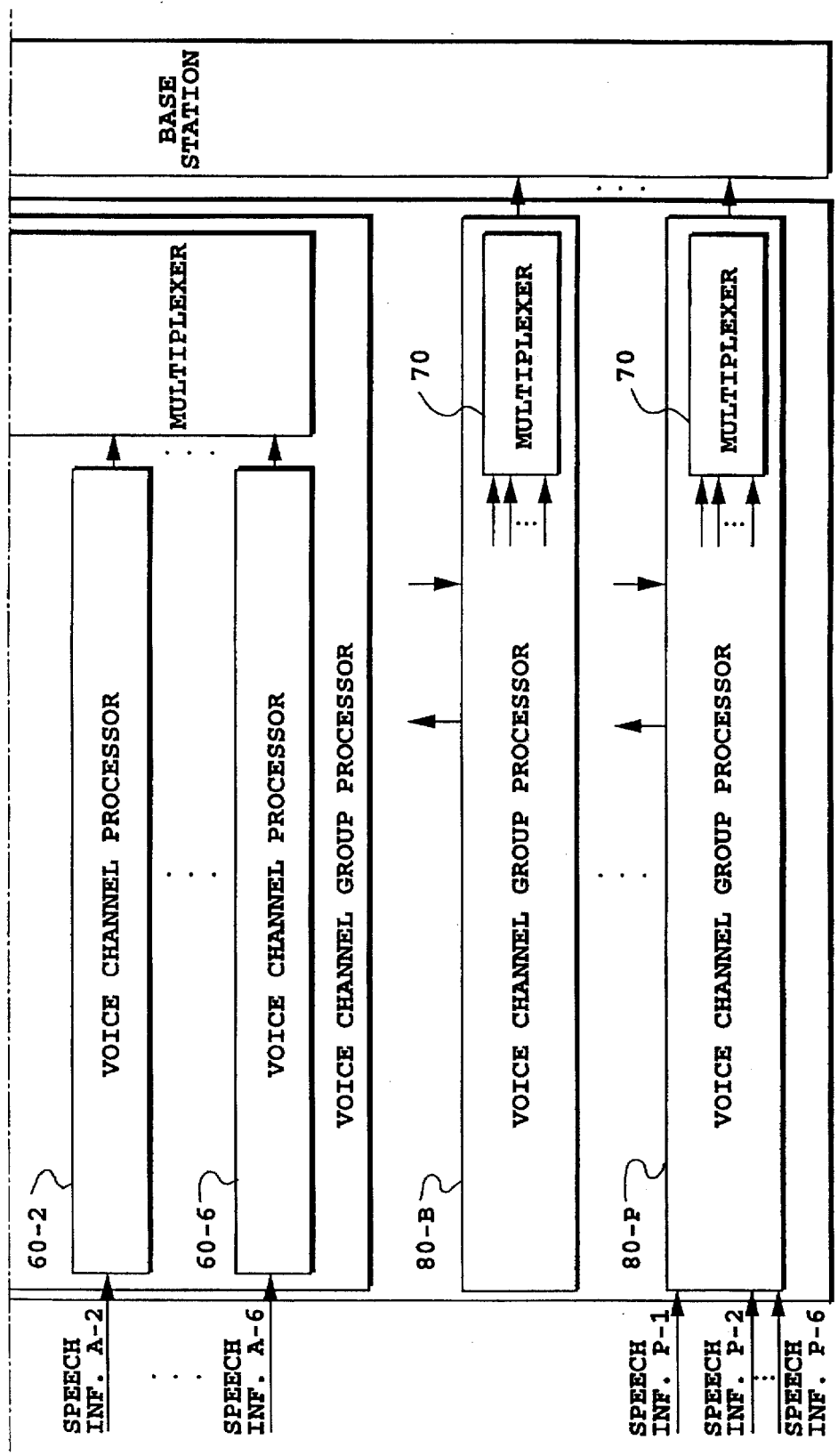

FIGS. 5A and 5B are block diagrams showing an embodiment of speech information freeze-out control equipment in a mobile satellite communication system in accordance with the present invention. The speech information freeze-out control equipment is provided in the control center 5.

Speech information A-1–A-6, . . . , P-1–P-6 from the public telephone terminals 1-1–1-m is fed to a voice encoder 22 in a speech information processor 20. The voice encoder 22 divides the speech information every ⅙ frame interval to voice encode it, and feeds the encoded voice to a voice power detector 24 and a multiplexer 70. The voice power detector 24 measures average power of the speech information in each frame, and supplies it to a speech/speechless decision block 32 of a speech information identifier 30.

The speech/speechless decision block 32 decides that a speech spurt is present when the average power of the frame measured by the voice power detector 24 is equal to or greater than a predetermined threshold, and that the speech spurt is absent when the voice power is less than the threshold, and feeds the result to a transmission request flag generator 34. The transmission request flag generator 34 sends a transmission request flag to a freeze-out controller 50 when the decision result indicates that the speech spurt is present, thereby requesting the transmission of the frame.

The freeze-out controller 50 determines whether the frame is to be transmitted or frozen out, and if it is to be transmitted, the controller 50 feeds the result to a transmission enable flag generator 42 in a freeze-out processor 40. The transmission enable flag generator 42 sends a transmission enable flag to the multiplexer 70 to permit the transmission of the frame.

Thus, the speech information freeze-out control equipment is provided for each channel with a voice channel processor 60 including the speech information processor 20, the speech information identifier 30 and the freeze-out processor 40. Then, six voice channel processors 60-1–60-6 are connected to one of the multiplexers 70, and these components constitute one voice channel group processor 80. In these figures, P voice channel group processors 80-A–80-P are provided, and the respective voice channel processors 60 are controlled by the freeze-out controller 50.

The freeze-out controller 50 includes a transmission request number counter 52. The transmission request number counter 52 counts the number of the transmission requests occurred in the entire equipment at every ⅙ frame interval, that is, at every time slot interval. This is performed by counting the transmission request flags sent from the transmission request flag generator 34. The count value is fed to a decision block 54. The decision block 54 compares the count value with a predetermined upper limit value, decides whether the count value exceeds the upper limit value, and informs a freeze-out channel decider 56 of the result. The freeze-out channel decider 56 decides, when the count value exceeds the upper limit value, a channel to be frozen out in the channel group sending the latest transmission request. One the other hand, when the count value is equal to or less than the upper limit value, the freeze-out channel decider 56 provides a transmission permission to the channel sending the latest transmission request. These results are fed to a transmission enable notifier 58. The transmission enable notifier 58 notifies the transmission enable flag generator 42 of the channel which issued the latest transmission request about the result of the transmission permission or the freeze-out. Thus, the freeze-out controller 50 counts the number of the transmission request every ⅙ frame interval, that is, every time slot interval, and provides the transmission permission as long as the count value does not exceed the upper limit value.

Figure 7:
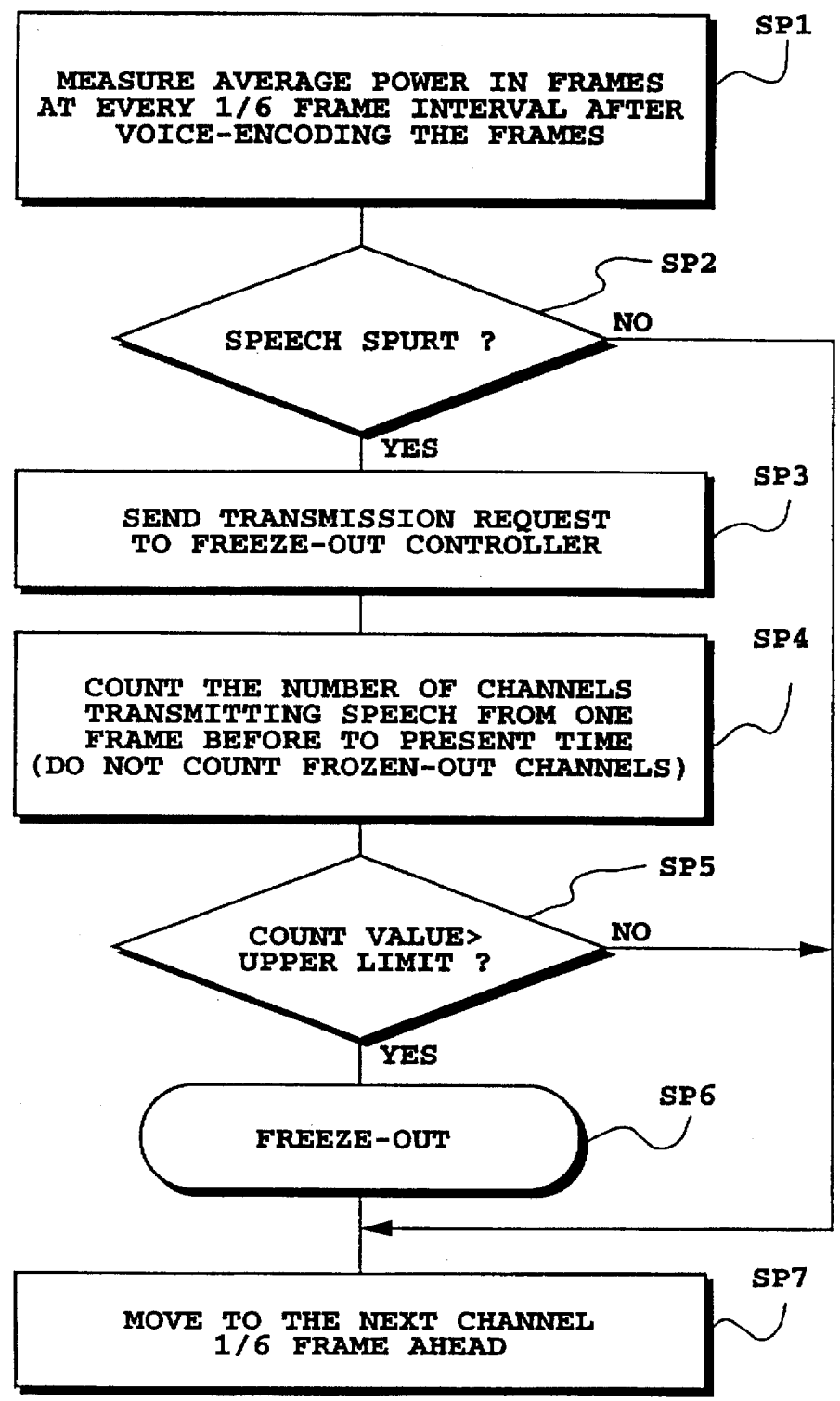
FIG. 7 is a flowchart illustrating the operation of the freeze-out control in the first embodiment.

FIG. 6 is a time chart showing the operation of such freeze-out control, and FIG. 7 is a flowchart showing the operation.

As shown in FIG. 6, FIGS. 6(A)–(F) show the input speech information to the respective channels CH-1–CH-6 of the control center 5, and FIG. 6(G) shows a time division multiplexed signal to be transmitted from the control center 5 to the base station 8. In addition, FIG. 6(H) shows count sections of the number of transmission requests, and FIGS. 6(I)–(N) show transmitted signals from the base station 8 to the transponders 13. As is seen from FIG. 6(G), one frame is divided into 6 time slots, and the speech information of the channels CH-1–CH-6 is assigned to each one of time slots. The upper limit value of the number of channels to be assigned is three, and the transmission request exceeding the upper limit value undergoes the freeze-out processing.

An example of the freeze-out processing will now be described with reference to the flowchart of FIG. 7. First, at step SP1, the six voice power detectors 24 belonging to each channel group sequentially measure the average voice powers of individual frames of the channels at every ⅙ frame interval, that is, at every one time slot interval. For instance, the voice power detector 24 of the channel CH-1 measures and outputs the average voice power of the first frame of the channel CH-1 at the end time t21 of the first frame, and the voice power detector 24 of the channel CH-2 measures and outputs the average voice power of the first frame of this channel CH-2 at the end time t22 of the first frame.

At step SP2, the speech/speechless decision block 32 sequentially decides the presence or absence of a speech spurt in each frame of the channel. For example, the speech/speechless decision block 32 of the channel CH-1 decides the presence and absence of the speech spurt in the first frame of the channel CH-1 at time t21, and the speech/speechless decision block 32 of the channel CH-2 decides the presence and absence of the speech spurt in the first frame of the channel CH-2 at time t22. When the speech spurt is present, the transmission request flag generator 34 sends a transmission request flag to the freeze-out controller 50 at step SP3.

At step SP4, the transmission request number counter 52 of the freeze-out controller 50 counts the number of the transmission requests from the entire channels in the channel groups. The count is performed from the initial point of the immediately preceding frame to the current time. For example, at the end point t31 of the second frame of the channel CH-1 (that is, at the initial point of the third frame), the transmission request number counter 52 of the freeze-out controller 50 counts the number of transmission requests from the time t21 to t31, where the time t21 is the initial point of the immediately preceding frame of the current time t31. In this case, the speech/speechless decision block 32 of the channel CH-1 decides the presence and absence of the speech spurt of the second frame of the channel CH-1, and since the speech spurt is present, the transmission request flag generator 34 issues a transmission request. Thus, the count value at time t31 becomes four, and exceeds the upper limit value of three. As a result, the decision block 54 decides that the number of transmission requests is greater than the upper limit value at step SP5, and notifies the transmission enable notifier 58 of the result. The transmission enable notifier 58 freezes out the frame through the transmission enable flag generator 42 of the freeze-out processor 40 at step SP6. Subsequently, the processing proceeds to the next time slot at step SP7, so that a similar processing is carried out for the next channel. When no speech spurt is detected at step SP2, the processing proceeds to the next channel at step SP7.

Thus, the freeze-out control processing is carried out for the entire channels in the channel group during one frame interval by sequentially shifting timings by an amount of 1/6 frame interval. This makes it possible to eliminate the shortage of the prior art described with reference to FIG. 3 in that the number of the transmission channels exceeds the upper value.

EMBODIMENT 2

Figure 8:
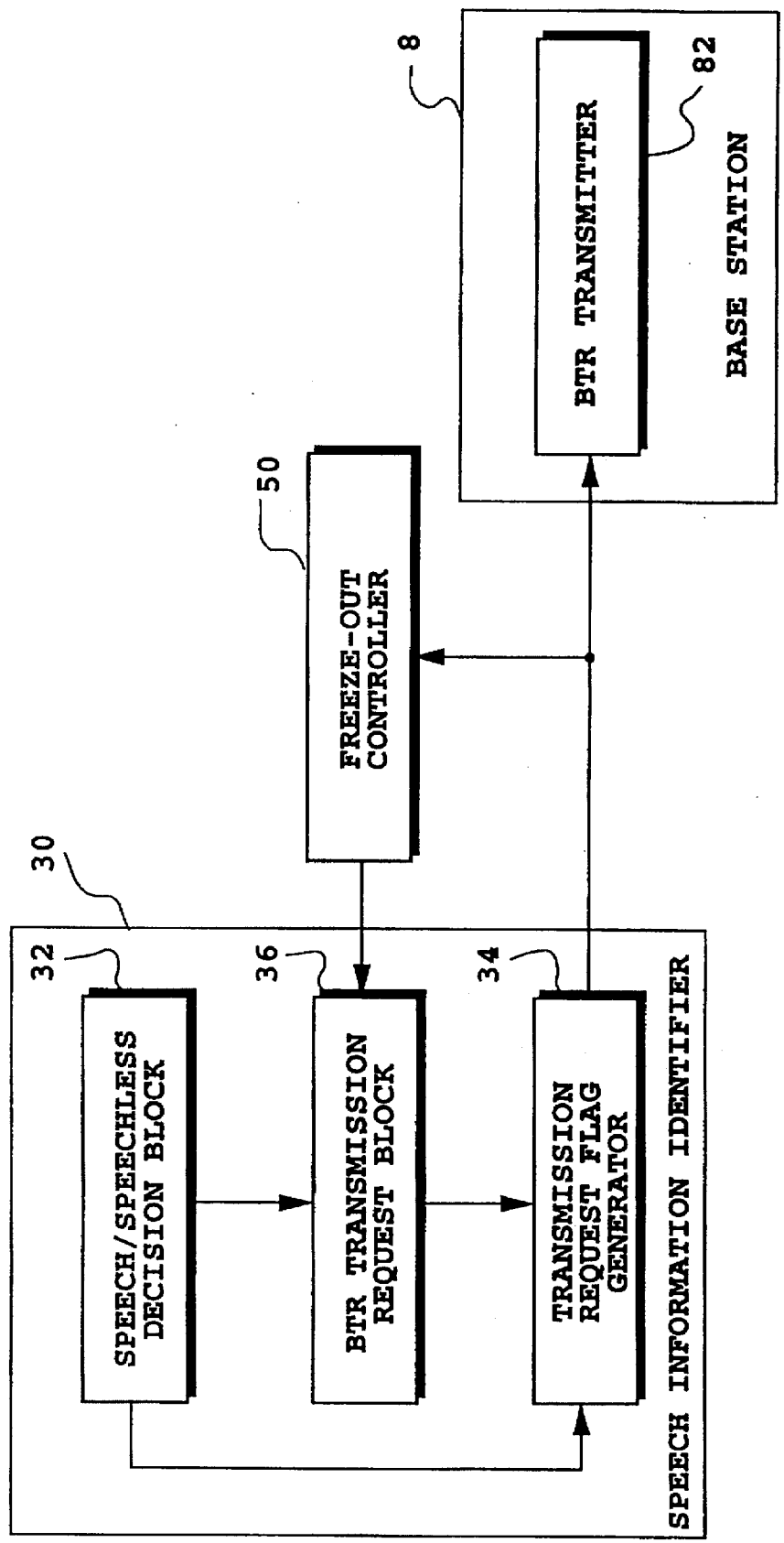
FIG. 8 is a block diagram showing a major portion of a second embodiment of speech information freeze-out control equipment in a mobile satellite communication system in accordance with the present invention.

A second embodiment aims at eliminating the shortage involved in inserting the BTR as described before. FIG. 8 is a block diagram showing a major portion of the second embodiment. The second embodiment differs from the first embodiment in the following:

(1) The second embodiment is provided with a BTR transmission request block 36 inserted between the speech/speechless decision block 32 and the transmission request flag generator 34 in the speech information identifier 30. As described before, when the carrier is turned ON from the OFF state at the base station 8, a BTR (Bit Timing Recovery) must be inserted immediately before the speech information. Although the first embodiment does not consider the BTR, the second embodiment inserts the BTR. The BTR transmission request block 36 is provided for this purpose. In addition, a BTR transmitter 82 is provided in the base station 8.

Figure 9:
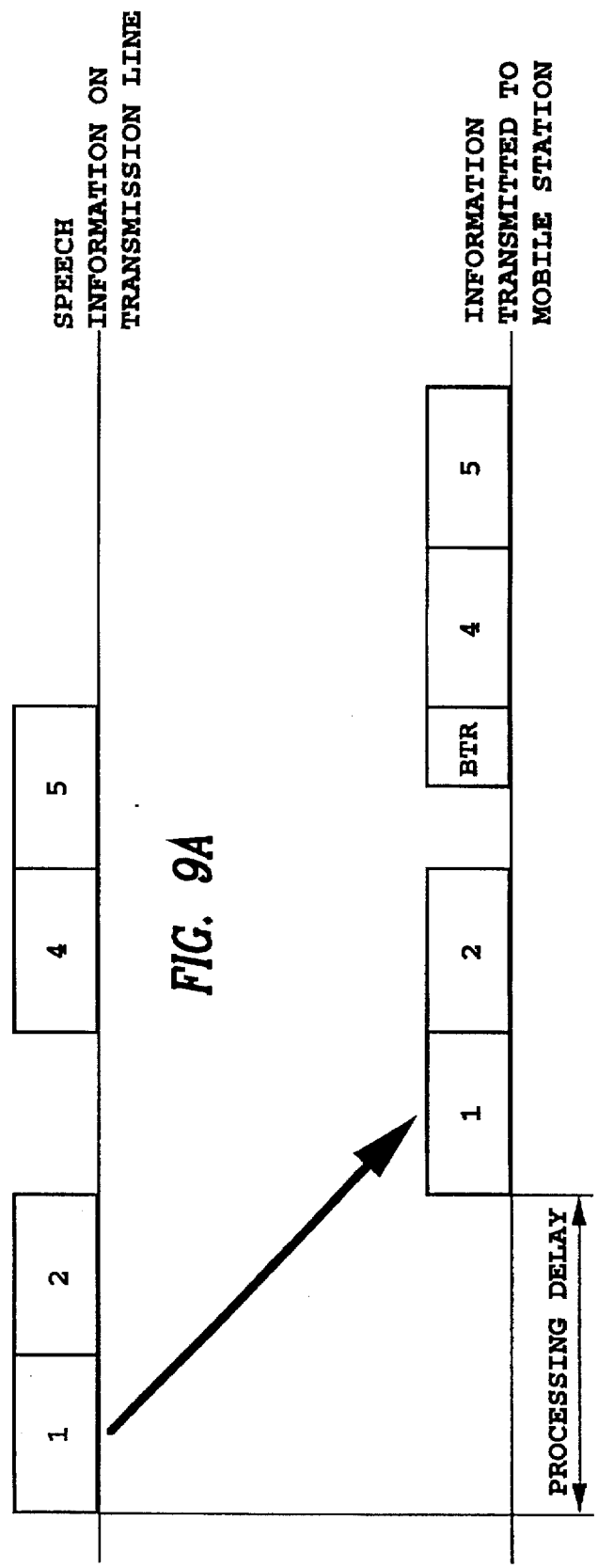
FIG. 9 is a schematic diagram illustrating position and duration of a BTR inserted in the second embodiment.

FIG. 9 is a schematic diagram illustrating the insertion method of the BTR in this embodiment. FIG. 9(A) illustrates the speech information sent from the control center 5 to the base station 8, and FIG. 9(B) illustrates the information transmitted from the base station 8 to the transponders 13. As shown in FIG. 9(B), a BTR of 1/2 frame long is inserted in the information sent from the base station 8. This is because the speechless state, which is caused by the omission of the frame 3 of the speech information, and continues from the end point of the frame 2 to the initial point of the frame 4, requires the resynchronization because no carrier is sent from the base station 8 to the transponders 13 during that time period. One of the features of the present invention is that it shortens the BTR to 1/2 frame long, and inserts it at the latter half of the frame in which no carrier is sent in the conventional system.

Figure 10:
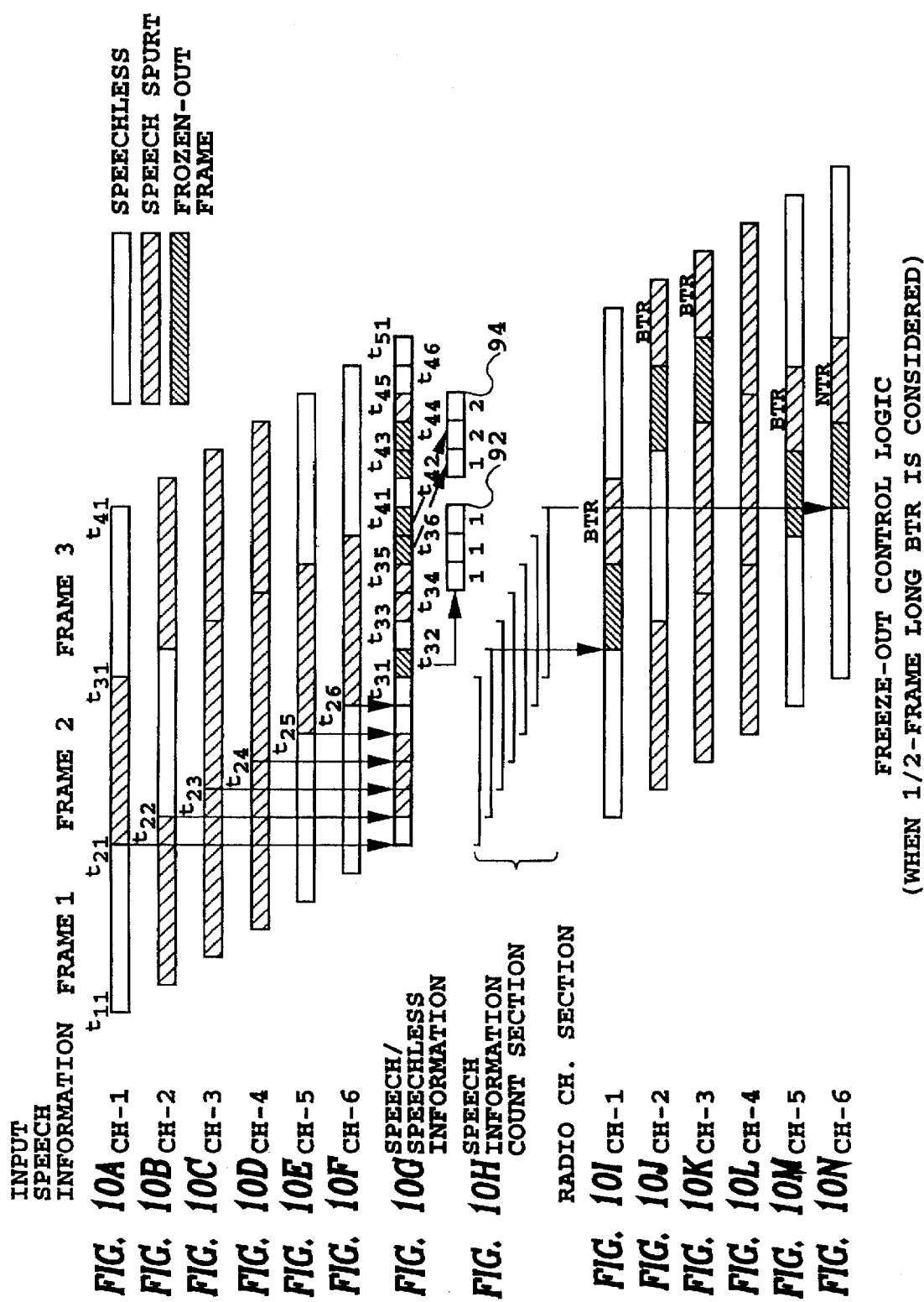

(2) The second embodiment increments the number of transmission request by one during three time slots beginning from three time slots (1/2 frame interval) after the beginning of the frozen-out frame as indicated by the reference numerals 92 and 94 in FIG. 10 corresponding to FIG. 6 of the first embodiment. This is because the BTRs inserted during these intervals each increase the transmission count values by one.

For example, when the second frame of the channel CH-1 is frozen out at time t31, the count value is incremented by one over three time slots from time t34 to time 41, the time t34 being three time slots ahead of the initial point t31 of the second frame. In addition, when the second frame of the channel CH-5 and the second frame of the channel CH-6 are successively frozen out at times t35 and t36, the following action is taken. First, the count value is incremented by one over three time slots from time t42 to t45, the time t42 being three time slots ahead of time t35. Subsequently, the count value is further incremented by one over three time slots from time t43 to t46, the time t43 being three time slots ahead of time t36. Accordingly, the count value is increased by two from time t43 to t45. Thus, the insertion of the BTR, and the count up processing involved in this are carried out.

Figure 11:
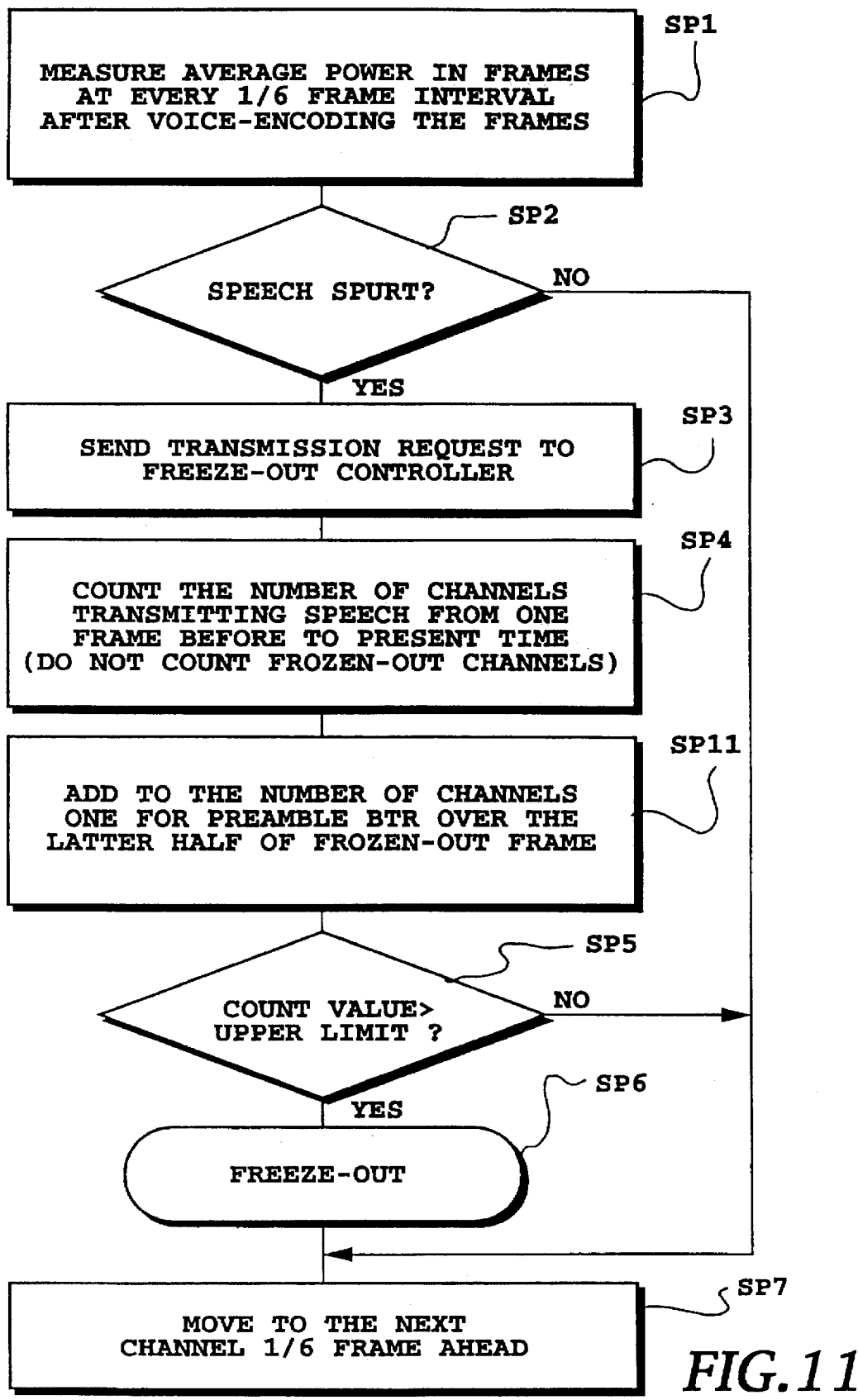
FIG. 11 is a flowchart illustrating the operation of the freeze-out control in the second embodiment.

FIG. 11 is a flowchart showing the operation of the freeze-out control in the case where the BTR is inserted, which corresponds to FIG. 7 of the first embodiment. FIG. 11 differs from FIG. 7 in that step SP11 is added after step SP4. Step SP11 is a step for incrementing the count value described at (2) above.

According to the present embodiment, the freeze-out processing is carried out including the BTR. Accordingly, communications between the base station 8 and the transponders 13 are always performed within the upper limit value of the channels.

Furthermore, although the voice is interrupted during the freeze-out on the channel, substantial degradation of voice quality on that channel due to successive freeze-out is avoidable because many traffic channels are usually used in such a system.

EMBODIMENT 3

Before describing a third embodiment, we will explain a problem of a prior art relating to preambles, and a shortage of the second embodiment. A preamble referred to as a speech preamble (called PRE for simplicity) can be used in addition to the BTR described in the second embodiment. The BTR is a preamble for recovering bit timing of the modem of a mobile station when the transmission state is switched from the absence to presence of the carrier. On the other hand, the PRE is used to regenerate the speech information without delay when the transmission state changes from the absence to presence of a speech spurt, independently of the presence or absence of the carrier.

FIG. 12A illustrates a method for inserting the PRE by a conventional technique. It continues to send the carrier without interruption even during the absent section of the speech spurt, with a synchronizing signal inserted into part of each frame. Thus, since the synchronizing signal is transmitted in the absent section of the speech spurt, it is not necessary to send the BTR, and only the PRE is transmitted at time t4 when a frame including the speech spurt is detected. Since it takes one frame period for detecting the presence of the speech spurt, and another frame period for sending the PRE, a total of two frame delay occurs, although the frames are correctly sent without losing a frame.

However, it is preferable that the transmission of the carrier be interrupted in speechless sections to increase effectivity of the transponders in the mobile satellite communication system. Thus, a method is planed for interrupting the transmission of the carrier in the speechless section, and sending the BTR when the speech spurt occurs, followed by the PRE as shown in FIG. 12B. This method corresponds to the second embodiment, in which the duration of the BTR is set at ½ frame interval. With this method, when the speech spurt in frame 3 is detected at time t4, the BTR is transmitted from time t4a, ½ frame interval ahead of time t4, and then the PRE is sent from time t5. In this case, frame 4 is sent from time t6 as the original speech information. Accordingly, the speech information of the frame 3 is skipped, though the delay from reception to transmission of the original speech involved in the speechless section is limited to two frames. To prevent the frame 3 from being omitted, the delay must be set at three frame intervals by adding one frame interval as shown in FIG. 12C.

The third embodiment is implemented to overcome such a problem. In this embodiment, one frame is divided into a plurality of subframes, and the presence and absence of the speech spurt is detected by measuring the average power in the subframes.

Figure 13:
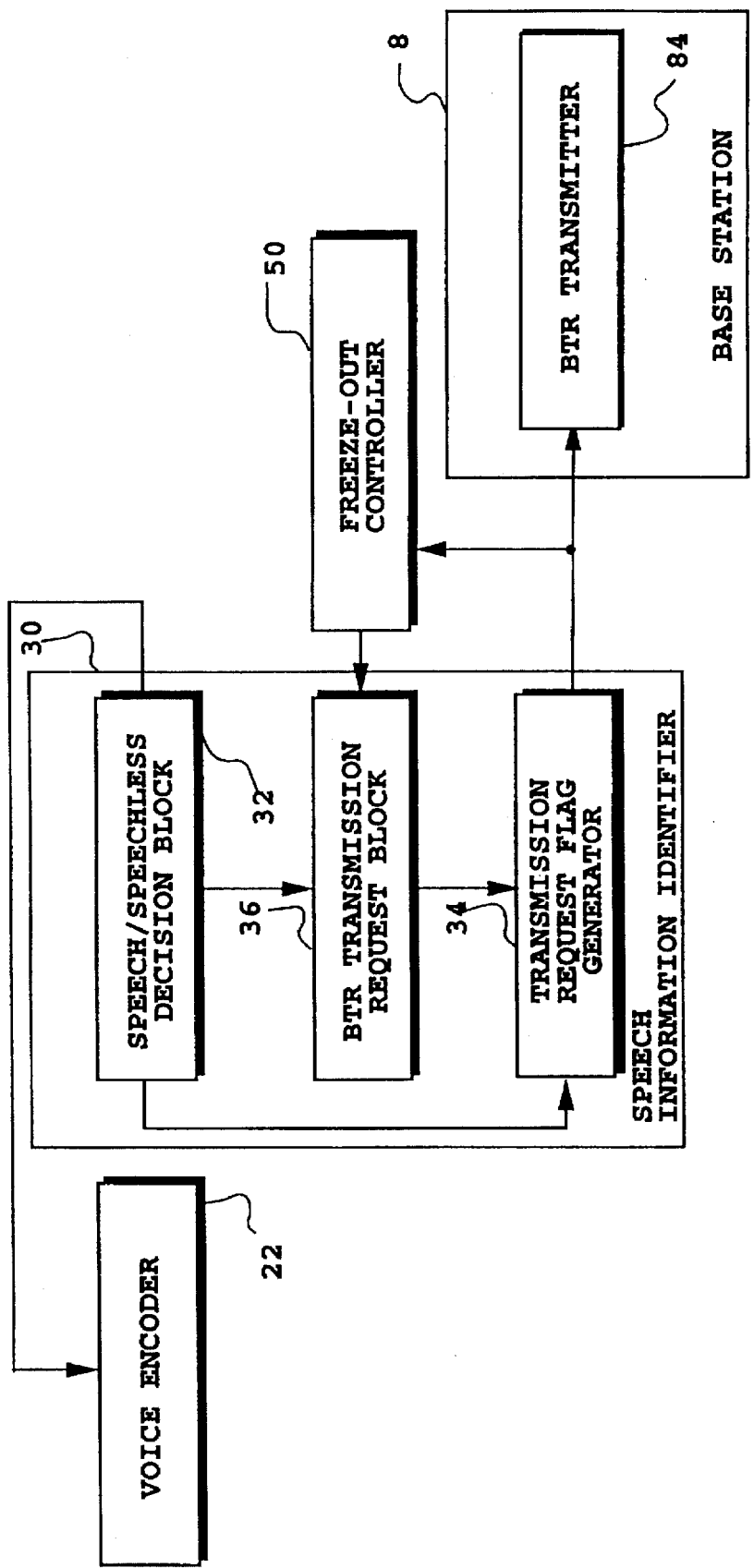
FIG. 13 is a block diagram showing a major portion of a third embodiment of speech information freeze-out control equipment in a mobile satellite communication system in accordance with the present invention.

FIG. 13 is a block diagram showing a major portion of the embodiment. This embodiment differs from the first embodiment as shown in FIGS. 5A and 5B in the following: a BTR transmission request block 36 is inserted in the speech information identifier 30 as shown in FIG. 13; and the speech/speechless decision block 32 divides a frame into subframes, detects the presence and absence of the speech spurt on the subframe basis, and informs the voice encoder 22 of the transition from the absence to presence of the speech spurt so that the voice encoder 22 transmits the PRE. In addition, a BTR transmitter 84 is provided in the base station 8 to send the BTR.

FIGS. 14A and 14B are time charts illustrating the operation of the embodiment. FIG. 14A shows the case where the presence of the speech spurt is detected at the middle (time t3a) of frame 3 because the speech spurt is present from the initial position of the frame 3, whereas FIG. 14B shows the case where the presence of the speech spurt is detected at the end (time t4) of the frame 3 because the speech spurt occurs from an intermediate position in the frame 3.

In FIG. 14A, when the presence of the speech spurt is detected at time t3a, the BTR is sent without delay. Since ½ frame is long enough for the BTR, it is possible to sent the PRE from time t4, and the frame 3 from time t5. In other words, it is possible to transmit the original information without skipping a frame, while restricting the delay from the reception of the original information to the transmission onto the radio frequency section to two frame intervals.

In FIG. 14B, since the presence of the speech spurt is not detected until time t4, the transmission of the BTR must be postponed until time t4a. This is because the BTR is inserted at the latter half of the frame. Thus, the transmission of the PRE begins at time t5, and hence the frame 3 including the speech spurt is lost. In this case, however, since the frame 3 includes the speech spurt only in the latter half of the frame as shown in FIG. 14B(a), the amount of the lost information is below ½ frame.

FIG. 15 is a table comparatively showing the subframe method in accordance with the present invention, which performs detection of the presence and absence of the speech spurt by dividing the frame, with a conventional method which performs it without dividing the frame. For the purpose of simplifying the comparison, only data associated with two frame delay are shown.

As is found from this table, although the number of omitted speech frames is one at the maximum, and ½ at the average in the conventional single frame method, it is zero when the speech spurt is present in the first half of the frame, and ½ at the maximum and ¼ at the average when the speech spurt is present only in the latter half of the frame in the subframe method in accordance with the present invention. Thus, the subframe method in accordance with the present invention can limit the average value of omitted frames to ⅛, which is much less than the conventional average value of ½.

Although it is assumed that the communications between the control center 5 and the base station 8 is performed by the time division multiplexing with the number of multiplexing being six, it is not limited to this value, and any value can be employed.

In addition, although the frame is divided into two subframes in the third embodiment, it can be divided into smaller subframes. The smaller the subframes, the faster the detection of the presence of the speech spurt. Furthermore, it is possible to detect the speech spurt over a plurality of subframes.

What is claimed is:

1. Speech freeze-out control equipment in a mobile satellite communication system having a plurality of telephone terminals, a control center connected with the telephone terminals through voice channels, a radio base station connected with the control center through time division multiplexing radio frequency channels, and a plurality of mobile stations connected with the base station through transponders, said control center performing, by assigning speech information from the telephone terminals to time slots of the time division multiplexing radio frequency channels, freeze-out of the speech information when sending the speech information to the base station so that the number of channels connected to the transponders is limited within a predetermined upper limit value, said speech freeze-out control equipment comprising:

presence/absence detection means for detecting the presence and absence of a speech spurt of said speech information in frames on said voice channels;

means for interrupting transmission from said control center to said radio base station in a time slot on said time division multiplexing radio frequency channels, said time slot corresponding to said voice channel including no speech spurt;

means for counting the number of said voice channels including said speech spurt for each time slot on said time division multiplexing radio frequency channels, said counting being carried out from one frame interval before a current time to said current time, said means for counting producing a count value;

means for freezing out speech information on one of said voice channels which is counted last when said count value exceeds said predetermined upper limit value; and means for transmitting speech information on one of said voice channels which is counted last to said base station when said count value of said voice channels including speech spurts is equal to or less than said predetermined upper limit value.

2. The speech freeze-out control equipment in a mobile satellite communication system as claimed in claim 1, further comprising means for incrementing said count value by one for ½ frame interval from ½ frame interval ahead of freezing out of said speech information to one frame interval ahead thereof.

3. The speech freeze-out control equipment in a mobile satellite communication system as claimed in claim 2, further comprising means for having said radio base station transmit to said transponders a predetermined preamble of ½ frame long when said presence/absence detection means successively detects a preceding frame including no speech spurt, and a current frame including a speech spurt.

4. The speech freeze-out control equipment in a mobile satellite communication system as claimed in claim 2, wherein said presence/absence detection means divides said frames into a plurality of subframes, and detects the presence and absence of said speech spurt in said frame on the basis of a voice level of each of said subframes.

5. The speech freeze-out control equipment in a mobile satellite communication system as claimed in claim 4, further comprising means for having said radio base station transmit to said transponders a predetermined preamble of ½ frame long when said presence/absence detection means successively detects a preceding subframe including no speech spurt, and a current subframe including a speech spurt.

6. A speech freeze-out control method in a mobile satellite communication system having a plurality of telephone terminals, a control center connected with the telephone terminals through voice channels, a radio base station connected with the control center through time division multiplexing radio frequency channels, and a plurality of mobile stations connected with the base station through transponders, said control center performing, by assigning speech information from the telephone terminals to time slots of the time division multiplexing radio frequency channels, freeze-out of the speech information when sending the speech information to the base station so that the number of channels connected to the transponders is limited within a predetermined upper limit value, said speech freeze-out control method comprising:

a presence/absence detection step of detecting the presence and absence of a speech spurt of said speech information in frames on said voice channels;

a step of interrupting transmission from said control center to said radio base station in a time slot on said time division multiplexing radio frequency channels, said time slot corresponding to said voice channel including no speech spurt;

a step of counting the number of said voice channels including said speech spurt for each time slot on said time division multiplexing radio frequency channels, said counting being carried out from one frame interval before a current time to said current time, said a step of counting producing a count value;

a step of freezing out speech information on one of said voice channels which is counted last when said count value exceeds said predetermined upper limit value; and a step of transmitting speech information on one of said voice channels which is counted last to said base station when said count value of said voice channels including speech spurts is equal to or less than said predetermined upper limit value.

7. The speech freeze-out control method in a mobile satellite communication system as claimed in claim 6, further comprising a step of incrementing said count value by one for ½ frame interval from ½ frame interval ahead of freezing out of said speech information to one frame interval ahead thereof.

8. The speech freeze-out control method in a mobile satellite communication system as claimed in claim 7, further comprising a step of having said radio base station transmit to said transponders a predetermined preamble of ½ frame long when said presence/absence detection step successively detects a preceding frame including no speech spurt, and a current frame including a speech spurt.

9. The speech freeze-out control method in a mobile satellite communication system as claimed in claim 7, wherein said presence/absence detection step divides said frames into a plurality of subframes, and detects the presence and absence of said speech spurt in said frame on the basis of a voice level of each of said subframes.

10. The speech freeze-out control method in a mobile satellite communication system as claimed in claim 9, further comprising a step of having said radio base station transmit to said transponders a predetermined preamble of ½ frame long when said presence/absence detection step successively detects a preceding subframe including no speech spurt, and a current subframe including a speech spurt.

11. A communication system which detects the presence and absence of a speech spurt in speech information in each frame successively sent through a receiving channel, and transmits only frames including the speech spurt through a transmission channel in assigned times for transmission, said assigned times lagging behind reception of the frames by a predetermined delay time, said communication system comprising:

current frame speech spurt detection means for detecting during receiving a current frame whether the current frame includes the speech spurt or not;

transmission interruption means for interrupting transmission of said current frame in said assigned times for transmission when said current frame includes no speech spurt;

preceding frame speech spurt detection means for detecting whether or not a preceding frame immediately before said current frame includes said speech spurt when said current frame includes said speech spurt; and preamble transmission means for transmitting a predetermined preamble at least during said delay time among said delay time and said transmission assigned time for said current frame, when said current frame includes said speech spurt and said preceding frame includes no speech spurt.

12. The communication system as claimed in claim 11, wherein said transmission channels are radio frequency channels.

13. The communication system as claimed in claim 11, wherein said current frame speech spurt detection means divides said current frame into a plurality of subframes, and detects the presence and absence of said speech spurt on the basis of a voice level of each of said subframes.

14. The communication system as claimed in claim 11, wherein said preamble transmission means successively transmits a preamble for synchronization and a preamble for speech.

15. A communications method which detects the presence and absence of a speech spurt in speech information in each frame successively sent through a receiving channel, and transmits only frames including the speech spurt through a transmission channel in assigned times for transmission, said assigned times lagging behind reception of the frames by a predetermined delay time, said communications method comprising:

a current frame speech spurt detection step of detecting during receiving a current frame whether the current frame includes the speech spurt or not;

a transmission interruption step of interrupting transmission of said current frame in said assigned times for transmission when said current frame includes no speech spurt;

a preceding frame speech spurt detection step of detecting whether or not a preceding frame immediately before said current frame includes said speech spurt when said current frame includes said speech spurt; and a preamble transmission step of transmitting a predetermined preamble at least during said delay time among said delay time and said transmission assigned time for said current frame, when said current frame includes said speech spurt and said preceding frame includes no speech spurt.

16. The communications method as claimed in claim 15, wherein said transmission channels are radio frequency channels.

17. The communications method as claimed in claim 15, wherein said current frame speech spurt detection step divides said current frame into a plurality of subframes, and detects the presence and absence of said speech spurt on the basis of a voice level of each of said subframes.

18. The communications method as claimed in claim 15, wherein said preamble transmission step successively transmits a preamble for synchronization and a preamble for speech.

* * * * *